United States Patent
Chen et al.

(10) Patent No.: US 11,938,639 B2
(45) Date of Patent: Mar. 26, 2024

(54) BOUNDARY PROTECTION METHOD AND SYSTEM OF RADIATION DETECTION ROBOT

(71) Applicants: TSINGHUA UNIVERSITY, Beijing (CN); NUCTECH COMPANY LIMITED, Beijing (CN)

(72) Inventors: Zhiqiang Chen, Beijing (CN); Jin Cui, Beijing (CN); Bin Hu, Beijing (CN); Dong Lin, Beijing (CN); Huawei Wu, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 428 days.

(21) Appl. No.: 17/333,886

(22) Filed: May 28, 2021

(65) Prior Publication Data
US 2022/0024039 A1    Jan. 27, 2022

(30) Foreign Application Priority Data
May 29, 2020  (CN) .......................... 202010476212.2

(51) Int. Cl.
*B25J 9/16* (2006.01)
*B25J 13/08* (2006.01)
(Continued)

(52) U.S. Cl.
CPC ........... *B25J 9/1676* (2013.01); *B25J 13/087* (2013.01); *G01T 1/1606* (2013.01); *G08B 21/182* (2013.01); *G08B 21/22* (2013.01)

(58) Field of Classification Search
CPC ..... B25J 9/1676; B25J 13/087; G01T 1/1606; G08B 21/182; G08B 21/22
(Continued)

(56) References Cited

U.S. PATENT DOCUMENTS

| 3,825,916 A | * | 7/1974 | Steele | .................. | G08B 13/183 |
| | | | | | 340/557 |
| 4,910,498 A | * | 3/1990 | Feher | .................. | G08B 21/086 |
| | | | | | 250/221 |

(Continued)

FOREIGN PATENT DOCUMENTS

| CN | 106290409 A | 1/2017 |
| CN | 108152808 A | 6/2018 |

OTHER PUBLICATIONS

Office Action dated May 5, 2022 issued in corresponding Chinese Application No. 202010476212.2.
(Continued)

*Primary Examiner* — Zhen Y Wu
(74) *Attorney, Agent, or Firm* — Nath, Goldberg & Meyer; Jerald L. Meyer (57) ABSTRACT

A boundary protection method and system of a radiation detection robot. The boundary protection method comprises: a first laser radar and a second laser radar are arranged diagonally, a first marking rod and a second marking rod are arranged diagonally; a boundary of an interlocking zone is defined by the first laser radar, the second laser radar, the first marking rod and the second marking rod; the object to be detected is placed in the interlocking zone; the radiation detection robot uses rays to detect the object to be detected in the interlocking zone; an early warning zone is provided outside the interlocking zone; wherein when it is detected that a person or object has intruded into the interlocking zone, the radiation detection robot stops emitting rays; and when it is detected that a person or object has intruded into the early warning zone, a warning is issued directly.

12 Claims, 6 Drawing Sheets

(51) Int. Cl.
    *G01T 1/16*     (2006.01)
    *G08B 21/18*     (2006.01)
    *G08B 21/22*     (2006.01)

(58) Field of Classification Search
    USPC .................................................. 340/541
    See application file for complete search history.

(56) References Cited

U.S. PATENT DOCUMENTS

| | | | | |
|---|---|---|---|---|
| 6,259,365 | B1* | 7/2001 | Hagar | G08B 21/086 |
| | | | | 340/556 |
| 6,774,790 | B1* | 8/2004 | Houston | G08B 13/183 |
| | | | | 340/556 |
| 6,806,811 | B1* | 10/2004 | Readler | G08B 13/126 |
| | | | | 340/552 |
| 8,830,060 | B2* | 9/2014 | Pikkarainen | G08B 13/248 |
| | | | | 340/567 |
| 10,726,538 | B2* | 7/2020 | Braune | G06V 20/52 |
| 2005/0024208 | A1* | 2/2005 | Maki | G08B 13/2497 |
| | | | | 340/506 |
| 2011/0007139 | A1* | 1/2011 | Brunetti | G08B 13/19669 |
| | | | | 348/51 |
| 2012/0188081 | A1* | 7/2012 | Van Katwijk | G01S 13/56 |
| | | | | 340/541 |
| 2012/0274466 | A1* | 11/2012 | Mezger | G08B 13/183 |
| | | | | 340/557 |
| 2013/0113625 | A1* | 5/2013 | Libby | G08B 13/2491 |
| | | | | 340/541 |
| 2014/0330433 | A1* | 11/2014 | Ciarelli | F16P 3/14 |
| | | | | 901/1 |
| 2016/0304028 | A1* | 10/2016 | Hathaway | G01S 13/931 |
| 2017/0075027 | A1* | 3/2017 | Rothenberger | G01S 17/42 |
| 2017/0356861 | A1* | 12/2017 | Belcher | G01N 23/203 |
| 2019/0001496 | A1* | 1/2019 | Lorenzoni | G01V 8/20 |
| 2019/0007659 | A1* | 1/2019 | Neubauer | G01B 11/14 |
| 2019/0137991 | A1* | 5/2019 | Agarwal | G01C 21/383 |
| 2020/0400275 | A1* | 12/2020 | Romano | F16P 3/147 |

OTHER PUBLICATIONS

Gao, "Study Area Index of living trees based on ground laser scanning", Chinese Doctoral Dissertations & Master's Theses Full-text Database (Master) Information Science and Technology—Feb. 15, 2016.

* cited by examiner

BOUNDARY PROTECTION METHOD AND SYSTEM OF RADIATION DETECTION ROBOT

TECHNICAL FIELD

The present application relates to the radiation detection technology, in particular to a boundary setting method, a method for parking judgment of an object to be detected, a boundary protection method and system of a radiation detection robot.

BACKGROUND

For X-ray operations, it is usually necessary to define a protection zone, and the radiation dose level within the protection zone usually exceeds the dose range acceptable to the public. In order to ensure public safety, it is necessary to isolate this protective zone and prohibit entry by unrelated personnel.

Currently the boundary isolation technology mostly adopts the method of using photoelectric beams or placing a caution tape. However, the method of placing a caution tape relies too much on the consciousness of the public, and it is difficult to stop some persons with a strong curiosity and prone to risk of accidental entry, so it requires manual boundary maintenance.

On the other hand, the use of photoelectric beams requires alignment of two sets of photoelectric beams, and the operation is more complicated. The larger the protection zone, the more difficult the operation.

In addition, in the current technology, the X-ray output immediately cuts off as soon as someone is detected to intrude. Since there is no precaution taken, the X-ray operation is easily interrupted by mistake.

SUMMARY

The object of the present application is to provide a boundary protection method and system that can solve any of the above problems.

Specifically, the present application provides a boundary setting method for a boundary protection system of a radiation detection robot, wherein the boundary protection system comprises a first laser radar, a second laser radar, a first marking rod and a second marking rod; the first laser radar and the second laser radar are arranged diagonally, and the first marking rod and the second marking rod are arranged diagonally, thereby defining a boundary of an interlocking zone; the interlocking zone is used to place an object to be detected; wherein the method comprises: the first laser radar and/or the second laser radar detect whether a range of the interlocking zone meets radiation protection requirements, and detect whether a shape of arrangement of the interlocking zone meets predetermined shape requirements, and if the range is too large or too small or the shape does not meet the requirements, it is prompted to re-arrange the first laser radar, the second laser radar, the first marking rod and the second marking rod.

In an embodiment, detecting whether the range and/or shape of the interlocking zone meets radiation protection requirements comprises: performing calculation based on azimuth angles of the marker rods and corresponding distance data obtained by scanning of the first laser radar and the second laser radar in combination with positions of the first laser radar and the second laser radar themselves to obtain an area and shape of the interlocking zone, and judging whether the shape meets the requirements by comparing a current shape of the interlocking zone with an expected shape, and judging whether the range of the interlocking zone meets the radiation protection requirements based on a current area of the interlocking zone, a radiation dose transmitted by the radiation detection robot, and a safe radiation dose tolerable to human body.

The present application also provides a method for parking judgment of an object to be detected in a boundary protection system of a radiation detection robot, wherein the boundary protection system comprises a first laser radar, a second laser radar, a first marking rod and a second marking rod; the first laser radar and the second laser radar are arranged diagonally, and the first marking rod and the second marking rod are arranged diagonally, thereby defining a boundary of an interlocking zone; the object to be detected is placed in the interlocking zone; wherein the method comprises: the first laser radar and/or the second laser radar determine whether a position and/or posture of the object to be detected meet the requirements, and when the position and/or posture of the object to be detected are found not to meet the requirements, it is instructed to re-arrange the object to be detected.

In an embodiment, determining whether the position and/or posture of the object to be detected meet the requirements comprises: judging at least one of whether the object to be detected touches or is close to the boundary of the interlocking zone, whether four sides of the object to be detected are parallel to four sides of the interlocking zone, and whether a center of the object to be detected is located near a center of the interlocking zone.

In an embodiment, a contour of the object to be detected is detected by the first laser radar and the second laser radar, and the position and/or posture of the object to be detected is determined according to azimuth data and distance data obtained by scanning of the first laser radar and the second laser radar.

A boundary protection method of a radiation detection robot, wherein a first laser radar and a second laser radar are arranged diagonally, and a first marking rod and a second marking rod are arranged diagonally; a boundary of an interlocking zone is defined by the first laser radar, the second laser radar, the first marking rod and the second marking rod; the object to be detected is placed in the interlocking zone; the radiation detection robot uses rays to detect the object to be detected in the interlocking zone; and an early warning zone is provided outside the interlocking zone; wherein when it is detected that a person or object has intruded into the interlocking zone, the radiation detection robot stops emitting rays; and when it is detected that a person or object has intruded into the early warning zone, a warning is issued directly, or it is determined whether to issue a warning according to an approach speed and/or approach distance of the intruded person or object.

In an embodiment, a warning is issued when the approach speed of the intruded person or object is greater than a speed threshold.

In an embodiment, a warning is issued when the approaching distance of the intruded person or object is less than a distance threshold.

In an embodiment, the area of the interlocking zone is set according to a safe radiation dose tolerable to human body.

In one scheme, it is detected concurrently whether a person or object has intruded into the interlocking zone and whether a person or object has intruded into the early warning zone are performed; alternatively, it is detected first whether a person or object has intruded into the interlocking zone, and when it is judged that no person or object has intruded into the interlocking zone, it is detected whether a person or object has intruded into the early warning zone.

In an embodiment, a distance from the boundary of the warning zone to a corresponding boundary of the interlocking zone is 2 meters to 20 meters.

In an embodiment, the first laser radar and/or the second laser radar are used to determine whether a person or object is approaching the interlocking zone, and determine the approach speed and approach distance.

In an embodiment, a plurality of marking points are arranged at edges of the early warning zone, and the marking points are marking points set on the ground at the location or four virtual points set in a map by the first laser radar and the second laser radar.

A boundary protection system of a radiation detection robot, wherein the system comprises a first laser radar, a second laser radar, a first marking rod and a second marking rod; the first laser radar and the second laser radar are arranged diagonally, and the first marking rod and the second marking rod are arranged diagonally, thereby defining a boundary of an interlocking zone; the first laser radar and the second laser radar further determine the boundary range of an early warning zone; and the first laser radar and the second laser radar perform real-time scanning on a person or object entering the early warning zone and the interlocking zone.

In an embodiment, the system communicates with the radiation detection robot through a control center, or communicates directly with the robot, and thus executes the boundary protection method according to any of the above embodiments.

The solutions according to these embodiments can effectively ensure the personal safety of the personnel around the protection zone, and are convenient and fast to use. By providing an early warning zone, a warning is issued before a person approaches the interlocking zone, so that accidental entry is reduced, robot operations are not easily interrupted by accidents, and the operation efficiency is improved. Moreover, it can be effectively detected whether the position and/or posture of the object to be detected meet the requirements, which improves the accuracy of subsequent X-ray detection.

DETAILED DESCRIPTION

In order to enable those skilled in the art to better understand the present application, the present application will be further described below in conjunction with accompanying drawings and embodiments. It should be noted that, if there is no conflict, the embodiments and features thereof in the present application can be combined with each other arbitrarily.

Figure 1:
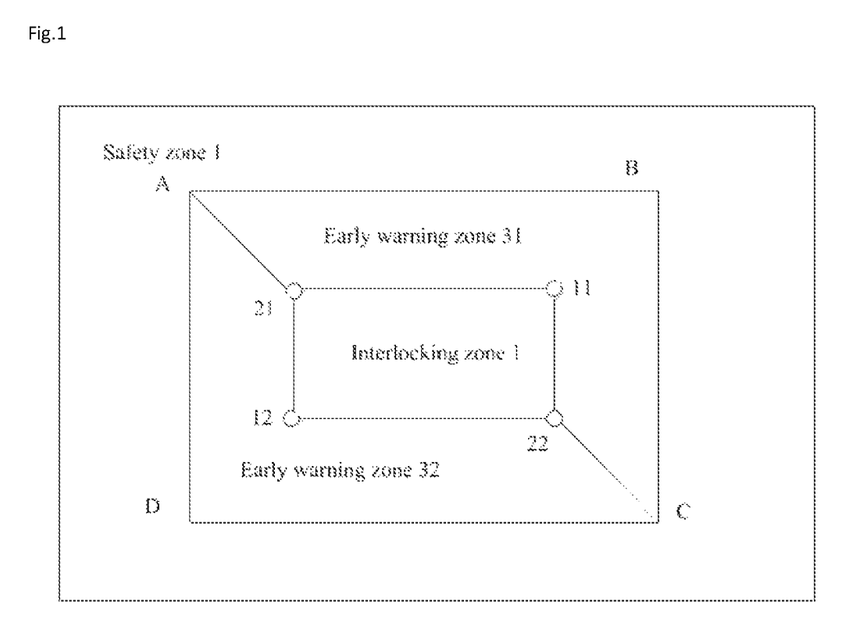
FIG. 1 is a schematic diagram of a dynamic boundary safety detection system according to the present application.
Figure 2:
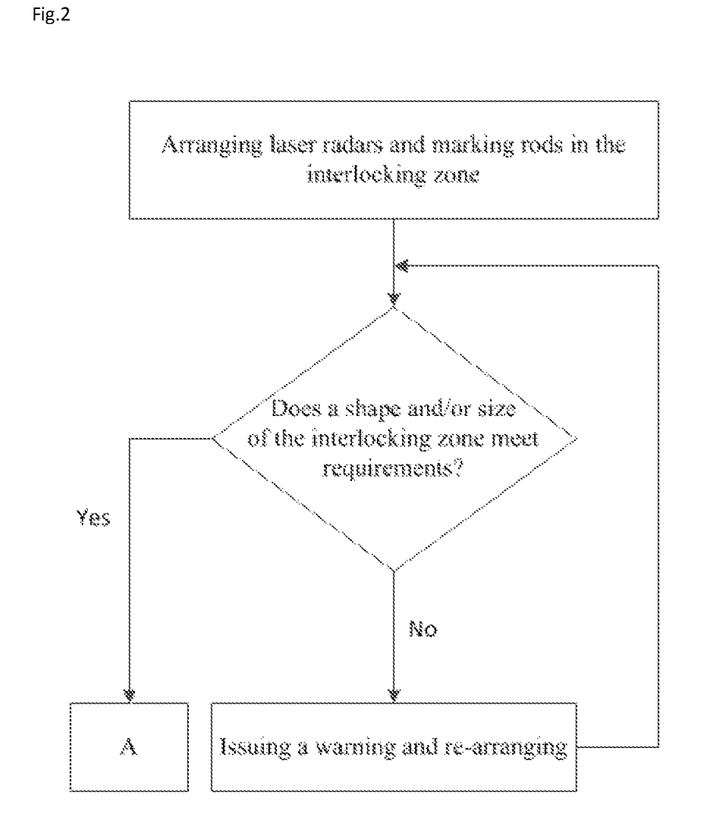
FIG. 2 is a flow chart of a boundary setting method of a boundary protection system according to the present application.

As shown in FIG. 1 and FIG. 2, the present application provides a boundary setting method for a boundary protection system of a radiation detection robot. The boundary protection system comprises a first laser radar 11, a second laser radar 12, a first marking rod 21 and a second marking rod 22. The first laser radar 11 and the second laser radar 12 are arranged diagonally, the first marking rod 21 and the second marking rod 22 are arranged diagonally, and a boundary of an interlocking zone is defined by the first laser radar, the second laser radar, the first marking rod and the second marking rod. An early warning zone is provided outside the interlocking zone.

The method comprises detecting whether a range of the interlocking zone meets the requirements of radiation protection, and at the same time judging whether a shape of arrangement of the interlocking zone meets the requirements (for example, it is required to be rectangular); and if the range is too large or too small or the shape of arrangement does not meet the requirements, it is prompted to re-arrange the first laser radar 11, the second laser radar 12, the first marking rod 21, and the second marking rod 22. If the range and shape of the interlocking zone meet the requirements, the method proceeds to the next step (represented by A in FIG. 2, for example, the step of judging whether the position and/or posture of the object to be detected meet the requirements).

In an embodiment, the first laser radar 11 and the second laser radar 12 are used to detect whether the range of the interlocking zone meets the radiation protection requirements.

In an embodiment, detecting whether the range and/or shape of the interlocking zone meets radiation protection requirements comprises: performing calculation based on azimuth angles of the marker rods and corresponding distance data obtained by the scanning of the first laser radar 11 and the second laser radar 12 in combination with positions of the first laser radar 11 and the second laser radar 12 themselves to obtain an area and shape of the interlocking zone, and judging whether the shape meets the requirements by comparing a current shape of the interlocking zone with an expected shape (for example, a rectangle) (as long as the difference between the current shape and the expected shape is less than the threshold), and judging whether the range of the interlocking zone meets the radiation protection requirements based on a current area of the interlocking zone, a radiation dose transmitted by the radiation detection robot, and a safe radiation dose tolerable to human body.

The solutions according to these embodiments can judge whether the interlocking zone meets the requirements in time, thereby avoiding the problem that the interlocking zone is found not to meet the requirements until the detection starts, and saving labor and time.

Figure 3:
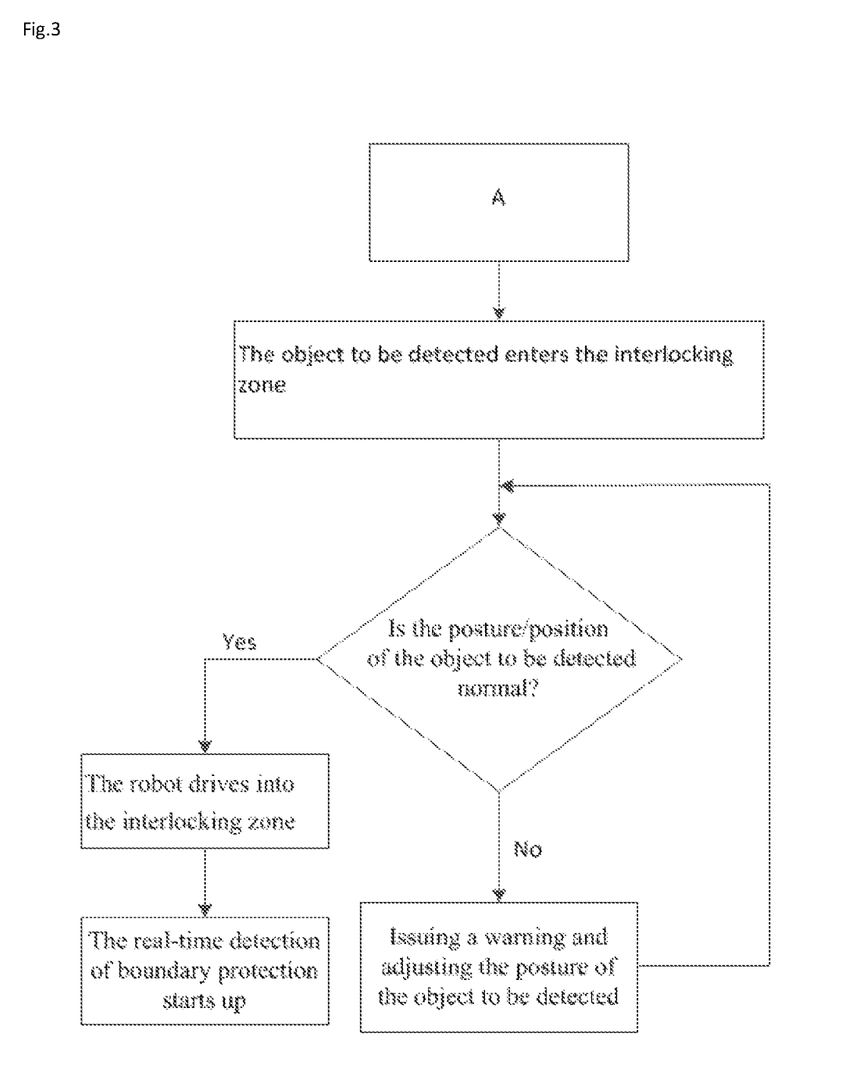
FIG. 3 is a flow chart of the method for parking judgment of an object to be detected in a boundary protection system according to the present application.
Figure 4:
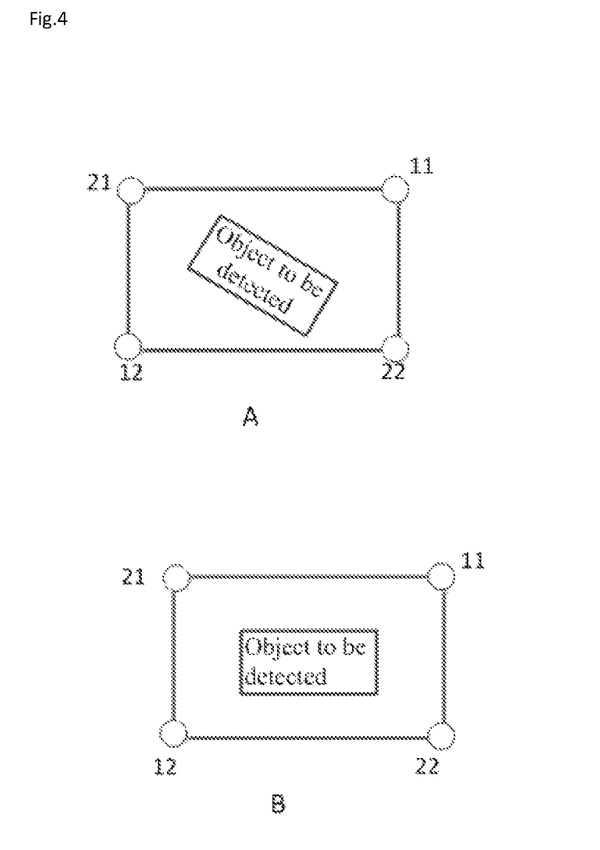
FIG. 4 is a diagram of parking states to be detected, A is over-deviated parking; B is normal parking.

As shown in FIG. 3 and FIG. 4, the present application also provides a method for parking judgment of an object to be detected in a boundary protection system of a radiation detection robot. The boundary protection system comprises a first laser radar 11, a second laser radar 12, a first marking rod 21 and a second marking rod 22. The first laser radar 11 and the second laser radar 12 are arranged diagonally, the first marking rod 21 and the second marking rod 22 are arranged diagonally, and a boundary of an interlocking zone is defined by the first laser radar, the second laser radar, the first marking rod and the second marking rod. An early warning zone is provided outside the interlocking zone. The object to be detected is placed/parked in the interlocking zone. When the position and/or posture of the object to be detected are found not to meet the requirements (as shown in FIG. 4A), a warning is issued and it is instructed to re-arrange the object to be detected (as shown in FIG. 4B).

In an embodiment, whether the position and/or posture meet the requirements comprises: whether the object to be detected touches or is close to the boundary of the interlocking zone, whether four sides of the object to be detected are parallel to four sides of the interlocking zone, whether a center of the object to be detected is located near a center of the interlocking zone, etc.

In an embodiment, the first laser radar 11 and the second laser radar 12 are used to detect the position and/or posture. Specifically, a contour of the object to be detected is detected by the first laser radar 11 and the second laser radar 12, and the position and/or posture of the object to be detected is determined according to azimuth data and distance data obtained by the scanning of the first laser radar and the second laser radar.

In an embodiment, the step of placing/parking the object to be detected in the interlocking zone is performed after the range of the interlocking zone meets the requirements.

According to such an embodiment, it is detected whether the position and/or posture of the object to be detected meet the requirements before the radiographic detection, so that the position and posture of the object to be detected can be ensured before the detection, thereby improving the accuracy and correctness of the detection.

Figure 5:
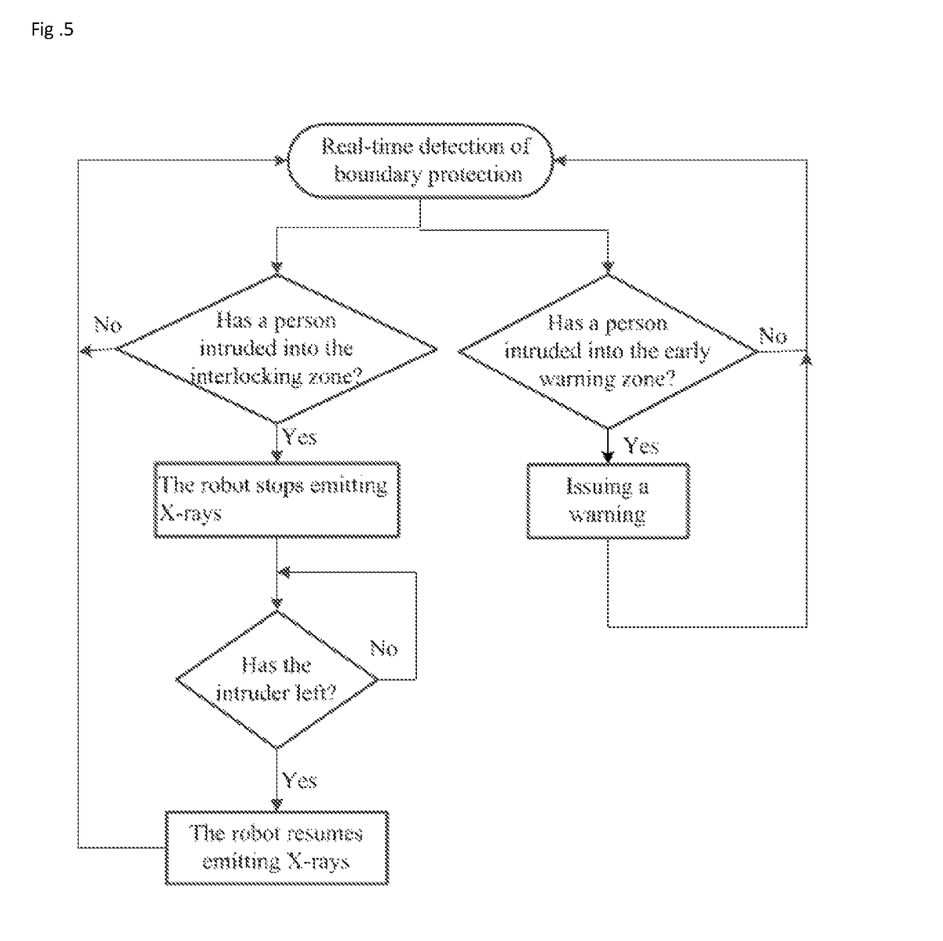
FIG. 5 is a flow chart of a boundary protection method according to the present application.
Figure 6:
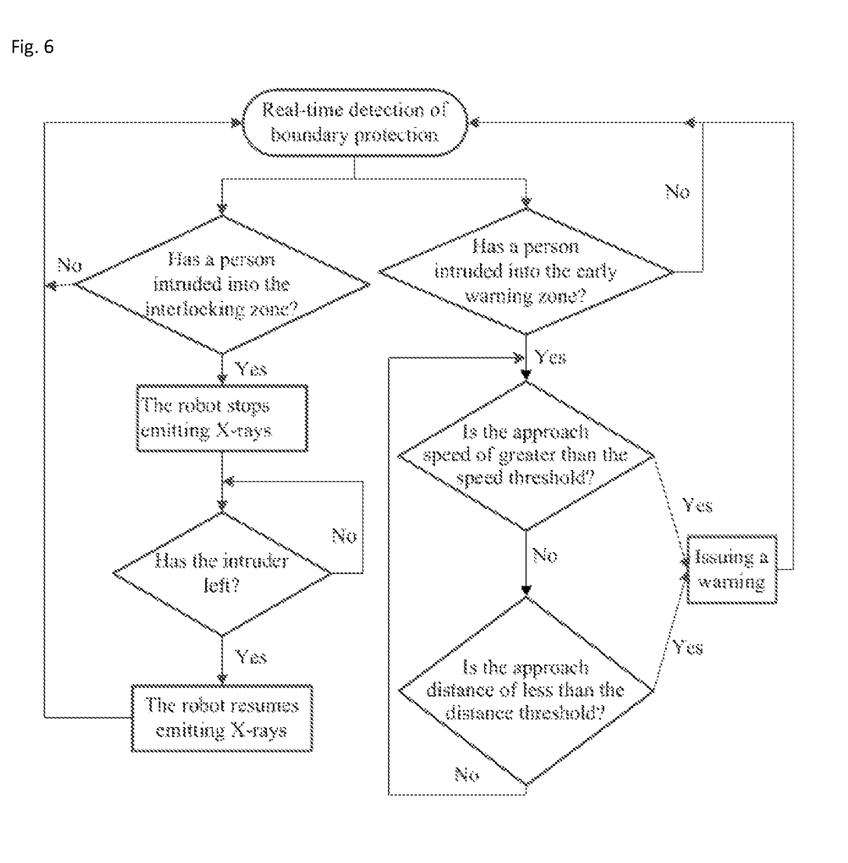
FIG. 6 is a flow chart of a boundary protection method for according to another embodiment of the present application.

As shown in FIG. 5 and FIG. 6, the present application also provides a boundary protection method of a radiation detection robot. The first laser radar 11 and the second laser radar 12 are arranged diagonally, and the first marking rod 21 and the second marking rod 22 are arranged diagonally. A boundary of an interlocking zone is defined by the first laser radar 11, the second laser radar 12, the first marking rod 21 and the second marking rod 22. The interlocking zone is used to place/park the object to be detected. An early warning zone is provided outside the interlocking zone. The early warning zone is used to issue a warning when an active person or thing (for the convenience of description, take "a person" as an example in the following content) intrudes. A certain dose of X-rays emitted by the radiation detection robot is used to detect the object to be detected.

When it is detected that a person has intruded into the interlocking zone, the radiation detection robot stops emitting X-rays. When it is detected that a person has intruded into the early warning zone, a warning will be issued directly (as shown in FIG. 5); or it is determined whether to issue a warning according to an approach speed and/or approach distance of the intruder (as shown in FIG. 6).

In an embodiment, the method further comprises: after the radiation detection robot (or other security inspection instrument) enters/drives into the interlocking zone, the robot communicates with the first laser radar 11 and/or the second laser radar 12, and it is set that the robot can emit X-rays only when the laser radar sends a permission signal (thereby completing the setting of the interlock switch).

In an embodiment, the range of the early warning zone is determined according to needs, and the boundary of the early warning zone is determined by the distance measuring function of the first laser radar 11 and the second laser radar 12.

In another embodiment, it is detected that a person has intruded into the early warning zone, the system dynamically determines whether to issue a warning according to the approach speed and/or approach distance of the intruder. For example, when the system judges that the approaching speed of an intruder is greater than a speed threshold, it issues a warning; alternatively, when the system judges that the approaching distance of the intruder is less than a distance threshold, it issues a warning; alternatively, when the system judges that the approaching speed of an intruder is greater than a speed threshold and the approach distance is less than a distance threshold, it issues a warning.

If it is judged that the approach speed and/or approach distance of the intruder does not exceed a corresponding threshold, no intervention will be made.

In an embodiment, the speed threshold can be selected and set according to actual conditions, such as the size of environment, X-ray dose, etc. In an embodiment, the speed threshold may be a value selected from 1.5 m/s to 4 m/s.

In an embodiment, the distance threshold is selected and set according to actual conditions, such as the size of environment, X-ray dose, etc. In an embodiment, the distance threshold may be a value selected from 1 meter to 10 meters.

In an embodiment, the first laser radar 11 and/or the second laser radar 12 determine the approach speed and approach distance by judging the person's position, moving speed, and moving direction. The approach speed is the component of the moving speed of the intruder in the direction vertical to the adjacent interlocking zone boundary. The approach distance is the value of the distance between the position of the intruder and the adjacent interlocking zone boundary.

In an embodiment, the area of the early warning zone can be selected according to actual conditions, such as considering the size of environment, the size of the object to be detected, and the safe radiation dose tolerable to human body, etc. In some embodiments, the distance from the boundary of the warning zone to a corresponding boundary of the interlocking zone is 2 meters to 20 meters. Outside the early warning zone is a safety zone. In the safety zone people can move around freely, and the system will not respond.

In an embodiment, the warning may be issued by the robot. In another embodiment, a separate alarm device, such as a lamp post and/or a horn, is further provided, and the warning is issued by the alarm device.

The solutions according to these embodiments can effectively ensure the personal safety of the personnel around the protection zone, and are convenient and fast. By providing an early warning zone, a warning is issued before a person approaches the interlocking zone, so that accidental entry is reduced, robot operations are not easily interrupted by accidents, and operation efficiency is improved. Moreover, it can be effectively detected whether the position and/or posture of the object to be detected meet the requirements, which improves the accuracy of subsequent X-ray detection.

In an embodiment, the edges of the early warning zone have four marking points, i.e., a first marking point A, a second marking point B, a third marking point C and a fourth marking point D.

The first laser radar 11, the first marking rod 21, the first marking point A, the second marking point B, the third marking point C, and the second marking rod 22 constitute a first sub-alarm zone 31.

The second laser radar 12, the first marking rod 21, the first marking point A, the fourth marking point D, the third marking point C, and the second marking rod 22 constitute a second sub-alarm zone 32.

The shape and connection lines in the figure are schematic. In practice, the first marking point A, the second marking point B, the third marking point C and the fourth marking point D may not be rectangular. In other words, the early warning zone can be other quadrilateral structures, and the edges of the early warning zone are not necessarily straight lines and may be arcs, as long as they are within the distance measuring range of the laser radar.

In an embodiment, the quantity of marking points may be more, such as 3, 6, 8, etc.

In a preferred embodiment, the first marking point A, the second marking point B, the third marking point C and the fourth marking point D are marking points set on the ground at the location; alternatively, they may be four virtual points set in a map by the first laser radar and 11 the second laser radar 12.

The present application also provides a boundary protection system of a radiation detection robot. The system comprises a first laser radar 11, a second laser radar 12, a first marking rod 21 and a second marking rod 22. The first laser radar 11 and the second laser radar 12 are arranged diagonally, and the first marking rod 21 and the second marking rod 22 are arranged diagonally, thereby defining a boundary of an interlocking zone. The first laser radar 11 and the second laser radar 12 further determine the boundary range of an early warning zone. The first laser radar and the second laser radar perform real-time scanning on a person or object entering the early warning zone and the interlocking zone.

In an embodiment, the system communicates with the radiation detection robot through a control center, or communicates directly with the robot, and thus executes the boundary protection method described in any of the above embodiments.

The working process of the boundary protection system of the radiation detection robot according to the present application when a person intrudes will be described below in conjunction with FIG. 6.

The system starts up and performs real-time detection.

It is detected whether a person has intruded into the interlocking zone and the early warning zone. If neither the interlocking zone nor the early warning zone is intruded, the system continues real-time detection; if a person has intruded into the interlocking zone, the radiation detection robot stops emitting x-rays; if a person has intruded into the early warning zone, a warning is issued.

When the person intruding the interlocking zone leaves, the radiation detection robot continues to work.

It may be detected concurrently whether a person has intruded into the interlocking zone and whether a person has intruded into the early warning zone; alternatively, it may be detected first whether a person has intruded into the interlocking zone, and when it is judged that no person has intruded into the interlocking zone, it is detected whether a person has intruded into the early warning zone.

In another embodiment, when it is detected concurrently whether a person has intruded into the interlocking zone and whether a person has intruded into the early warning zone, if a person has intruded into the interlocking zone, when the radiation detection robot stops emitting rays, no warning is issued with respect to whether a person has intruded into the early warning zone.

In an embodiment, when it is detected that a person has intruded into the early warning zone, the system dynamically judges whether the person is approaching the interlocking zone, and if so, a warning is issued to request the person to leave, otherwise no intervention is made.

In an embodiment, one or both of the first laser radar 11 and the second laser radar are used to judge whether a person is approaching the interlocking zone.

In an embodiment, the method further comprises detecting whether the position and/or posture of the object to be detected meet the requirements, and if not, issuing a warning and to prompt to re-arrange the object to be detected.

In an embodiment, due to the size difference of different objects to be detected, the range of the interlocking zone will also be adjusted according to the situation. Therefore, the method further comprises detecting whether the range of the interlocking zone meets the requirements. Specifically, detecting whether the range of the interlocking zone meets the requirements is to compare the range of a zone enclosed by the first laser radar 11, the second laser radar 12, the first marking rod 21 and the second marking rod 22 with a preset range of zone. If the range of the enclosed zone is too large or too small compared to the preset range of zone, a warning will be issued to prompt to re-arrange the first laser radar 11, the second laser radar 12, the first marking rod 21 and the second laser radar 22. After the re-arrangement is completed, the boundary protection of the interlocking zone and the early warning zone will start up.

The steps of detecting whether the position and/or posture of the object to be detected meet the requirements and whether the range of the interlocking zone meets the requirements may be performed during the real-time detection, or may be performed before the real-time detection.

Example 1

Take an X-ray backscatter robot as an example, the specific working process of the boundary protection system in Example 1 of the present application will be described below with reference to FIG. 2, FIG. 5 and FIG. 6.

The first laser radar 11, the second laser radar 12, the first marking rod 21 and the second marking rod 22 are arranged according to a predetermined range of the interlocking zone. The first laser radar 11 and the second laser radar 12 are arranged diagonally, the first marking rod 21 and the second marking rod 22 are arranged diagonally, and a boundary of an interlocking zone is defined by the first laser radar 11, the second laser radar 12, the first marking rod 21 and the second marking rod 22.

Subsequently, the first laser radar 11 and the second laser radar 12 judge and detect whether the range and shape of the interlocking zone meet the requirements of radiation protection. If the range is too large or too small, or the shape of arrangement does not meet the requirements, it will be prompted to re-arrange the first laser radar 11, the second laser radar 12, the first marking rod 21 and the second marking rod 22. If the range and shape of the interlocking zone meet the requirements, the step of judging whether the position and/or posture of the object to be detected meet the requirements (represented by A in FIG. 2) will be performed.

When the object to be detected has intruded into the interlocking zone, the first laser radar 11 and the second laser radar 12 detect the position and/or posture of the object to be detected, for example, whether the object to be detected touches or is close to the boundary of the interlocking zone, whether four sides of the object to be detected are parallel to four sides of the interlocking zone, whether a center of the object to be detected is located near a center of the interlocking zone, etc. If the position and/or posture of the object to be detected do not meet the requirements, a warning is issued to prompt to adjust the position and/or posture of the object to be detected. If the position and posture of the object to be detected meet the requirements, the next step is performed (as shown in FIG. 3).

The backscatter robot drives into the interlocking zone. Then, the backscatter robot communicates with the first laser radar 11 and the second laser radar 12, and it is set that the robot can emit X-rays only when the laser radar sends a permission signal (thereby completing the setting of the interlock switch), and the real-time detection of boundary protection starts up.

The backscatter robot emits X-rays toward the object to be detected and performs detection.

If it is detected that a person has intruded into the interlocking zone, the radiation detection robot stops emitting X-rays and judges whether the person has left the interlocking zone. After the intruder leaves, the radiation detection robot resumes emitting X-rays, and the system continues real-time detection.

If it is detected that a person has intruded into the early warning zone, it is determined whether to issue a warning according to the approach speed and/or approach distance of the intruder. When the approach speed of the intruder is greater than 1.5 m/s, or the approach distance between the intruder and the boundary of the interlocking zone is less than 5 m, a warning is issued. If the approach speed and approach distance of the intruder do not exceed the thresholds (1.5 m/s, 5 m), no warning is issued. The warning may be issued by the robot, or by a separate alarm device, such as a lamp post and/or a horn.

If it is detected that no one has intruded into the early warning zone, the system will not respond and continue the detection in real time.

The above only describes preferred embodiments of the present application and the technical principles used. A person skilled in the art should understand that the scope of the present application is not limited to the technical solutions formed by a specific combination of the above technical features, and should also cover other technical solutions formed by any combination of the above technical features or their equivalent features without departing from the inventive concept, for example, technical solutions formed by replacing the above features with technical features having similar functions disclosed in the present application (but not limited to them).

What is claimed is:

1. A boundary setting method for a boundary protection system of a radiation detection robot, wherein the boundary protection system comprises a first laser radar, a second laser radar, a first marking rod and a second marking rod;
   the first laser radar and the second laser radar are arranged diagonally, and the first marking rod and the second marking rod are arranged diagonally, thereby defining a boundary of an interlocking zone; and
   the interlocking zone is used to place an object to be detected;
   wherein the method comprises:
   the first laser radar and/or the second laser radar detect whether a range of the interlocking zone meets radiation protection requirements, and detect whether a shape of arrangement of the interlocking zone meets predetermined shape requirements, and
   if the range is too large or too small or the shape does not meet the requirements, the radiation detection robot is prompted to re-arrange the first laser radar, the second laser radar, the first marking rod and the second marking rod.

2. The boundary setting method according to claim 1, wherein detecting whether the range and/or shape of the interlocking zone meets radiation protection requirements comprises:
   performing calculation based on azimuth angles of the marker rods and corresponding distance data obtained by scanning of the first laser radar and the second laser radar in combination with positions of the first laser radar and the second laser radar themselves to obtain an area and shape of the interlocking zone, and
   judging whether the shape meets the requirements by comparing a current shape of the interlocking zone with an expected shape, and judging whether the range of the interlocking zone meets the radiation protection requirements based on a current area of the interlocking zone, a radiation dose transmitted by the radiation detection robot, and a safe radiation dose tolerable to human body.

3. A boundary protection method of a radiation detection robot, wherein a first laser radar and a second laser radar are arranged diagonally, a first marking rod and a second marking rod are arranged diagonally;
   a boundary of an interlocking zone is defined by the first laser radar, the second laser radar, the first marking rod and the second marking rod;
   an object to be detected is placed in the interlocking zone;
   the radiation detection robot uses rays to detect the object to be detected in the interlocking zone;
   an early warning zone is provided outside the interlocking zone;
   wherein when a person or object is detected as having intruded into the interlocking zone, the radiation detection robot stops emitting rays; and
   when a person or object is detected as having intruded into the early warning zone, a warning is issued directly, or a determination is made as to whether to issue a warning according to an approach speed and/or approach distance of the intruded person or object.

4. The boundary protection method according to claim 3, wherein a warning is issued when the approach speed of the intruded person or object is greater than a speed threshold.

5. The boundary protection method according to claim 3, wherein a warning is issued when the approaching distance of the intruded person or object is less than a distance threshold.

6. The boundary protection method according to claim 3, wherein the area of the interlocking zone is set according to a safe radiation dose tolerable to human body.

7. The boundary protection method according to claim 3, wherein whether a person or object is detected as having intruded into the interlocking zone and concurrently whether a person or object is detected as having intruded into the early warning zone; or, first whether a person or object is detected as having intruded into the interlocking zone, and when judged that no person or object has intruded into the interlocking zone, whether a person or object is detected as having intruded into the early warning zone.

8. The boundary protection method according to claim 3, wherein a distance from the boundary of the early warning zone to a corresponding boundary of the interlocking zone is 2 meters to 20 meters.

9. The boundary protection method according to claim 3, wherein the first laser radar and/or the second laser radar are used to determine whether a person or object is approaching the interlocking zone, and determine the approach speed and approach distance.

10. The boundary protection method according to claim 3, wherein a plurality of marking points are arranged at edges of the early warning zone, and the marking points are marking points set on a ground location or four virtual points set in a map by the first laser radar and the second laser radar.

11. A boundary protection system of a radiation detection robot, wherein the system comprises a first laser radar, a second laser radar, a first marking rod and a second marking rod;
    the first laser radar and the second laser radar are arranged diagonally, and the first marking rod and the second marking rod are arranged diagonally, thereby defining a boundary of an interlocking zone;
    the first laser radar and the second laser radar further determine a boundary range of an early warning zone; and
    the first laser radar and the second laser radar perform real-time scanning on a person or object entering the early warning zone and the interlocking zone.

12. The boundary protection system according to claim 11, wherein the system communicates with the radiation detection robot through a control center, or communicates directly with the robot.

\* \* \* \* \*